(12) United States Patent
Lagnado et al.

(10) Patent No.: US 8,467,743 B2
(45) Date of Patent: Jun. 18, 2013

(54) MULTI-ANTENNA RECEPTION SCHEME

(75) Inventors: Isaac Lagnado, Houston, TX (US); Leo J. Gerten, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/262,191

(22) PCT Filed: Mar. 27, 2009

(86) PCT No.: PCT/US2009/038605
§ 371 (c)(1),
(2), (4) Date: Sep. 29, 2011

(87) PCT Pub. No.: WO2010/110800
PCT Pub. Date: Sep. 30, 2010

(65) Prior Publication Data
US 2012/0058738 A1    Mar. 8, 2012

(51) Int. Cl.
*H03C 7/02*    (2006.01)
*H04M 1/00*   (2006.01)

(52) U.S. Cl.
USPC ........................................ 455/101; 455/575.7

(58) Field of Classification Search
USPC ............... 455/101, 82, 83, 562.1, 575.7, 129
See application file for complete search history.

(56) References Cited

U.S. PATENT DOCUMENTS

| | | | |
|---|---|---|---|
| 5,446,922 A * | 8/1995 | Siwiak et al. | 455/277.2 |
| 6,526,291 B1 * | 2/2003 | Ekstrom et al. | 455/562.1 |
| 6,535,748 B1 * | 3/2003 | Vuorio et al. | 455/552.1 |
| 6,560,443 B1 * | 5/2003 | Vaisanen et al. | 455/73 |
| 7,639,190 B2 * | 12/2009 | Shimasaki et al. | 343/702 |
| 7,835,426 B2 * | 11/2010 | Park et al. | 375/219 |
| 8,014,817 B2 * | 9/2011 | Suzuki et al. | 455/552.1 |
| 2005/0136906 A1 | 6/2005 | Azuma | |

FOREIGN PATENT DOCUMENTS

| | | |
|---|---|---|
| KR | 100577062 | 4/2006 |
| KR | 20060073199 | 6/2006 |

OTHER PUBLICATIONS

An International Search Report and Written Opinion for related PCT Application No. PCT/US2009/038605, dated Jun. 29, 2009, 11 pages.

\* cited by examiner

*Primary Examiner* — Sonny Trinh

(57) ABSTRACT

A device comprises a first antenna and a second antenna. During data transmission, only the first antenna transmits data. During data reception, the second antenna is the main reception antenna and the first antenna operates as a diversity antenna.

13 Claims, 3 Drawing Sheets

MULTI-ANTENNA RECEPTION SCHEME

BACKGROUND

Some mobile communication devices include more than one antenna. For example, in a two-antenna device, one of the antennas typically operates in all frequency bands of interest to the device, while the other antenna is usually reserved for application of diversity functions to received signals. When a receiving device is provided with multiple antennas, the receiving device can employ diversity principles to enhance signal reception. Tradeoffs between efficiency of performance, mechanical size and frequency bandwidth affect designs for wireless devices employing such multiple antennas.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus they should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein is a multi-antenna wireless device in which a first antenna performs main transmission and diversity reception functions while a second antenna performs main reception functions. By allocating the main transmission and main reception functions across two different antennas, each antenna has a smaller bandwidth requirement than it would otherwise have, because each antenna is responsible for a smaller portion of the frequency band than otherwise would be the case.

Figure 1:
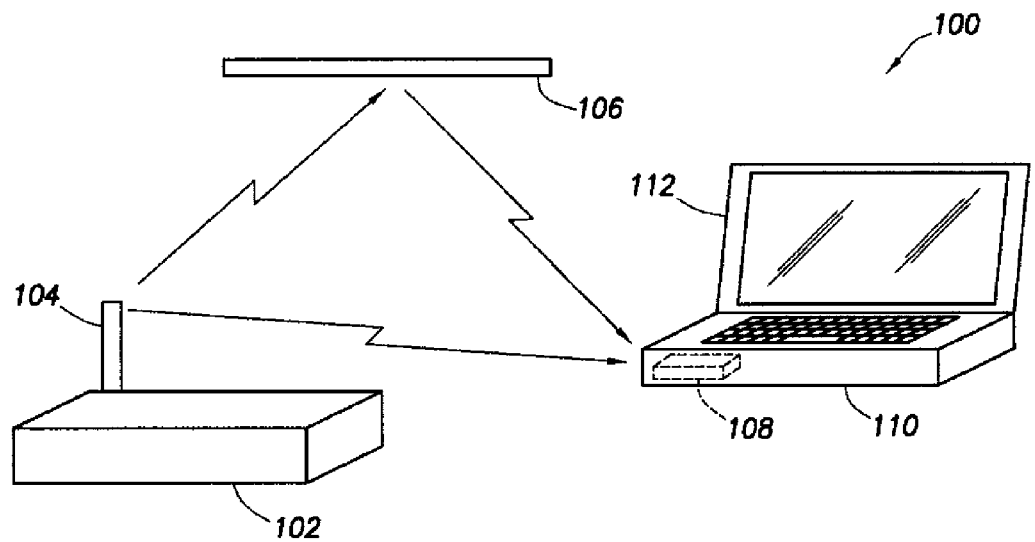
FIG. 1 shows a block diagram of an illustrative wireless communication system implementing the techniques disclosed herein, in accordance with embodiments.

FIG. 1 shows an illustrative wireless system 100 including a mobile communication device 110 comprising the antenna design described above, in accordance with embodiments. Although the mobile communication device 110 is shown as a notebook computer, the antenna design described herein may be used in conjunction with other devices as well, such as personal digital assistants, cellular telephones, etc. The system 100 includes a transmitting device 102, such as a cellular base station, a wireless router, etc. The transmitting device 102 includes an antenna 104 for transmission and reception of radio frequency signals. As a matter of convenience, only a single antenna 104 is illustrated. However, in practice, the transmitting device 102 may include any number of antennas.

The antenna 104 transmits a signal across a wireless channel between the transmitting device 102 and the device 110 by converting electrical signals to electromagnetic waves. Some transmitted signals may propagate through the channel directly to the device 110. Other transmitted signals may be reflected off of various obstacles and reflective surfaces, such as obstacle 106 (e.g., a building), and consequently arrive at the device 110 by a less direct path that results in increased signal attenuation and/or distortion.

Many wireless technologies allocate separate frequency bands for reception and transmission purposes, such that data being received is allocated to a specific frequency band and data being transmitted is allocated to a different frequency band. For example, wireless wide area network (WWAN) technology such as wideband code division multiple access (W-CDMA) is required to operate in receive mode at 824-849 MHz and in transmit mode at 869-894 MHz.

The device 110 includes a wireless transceiver 108 for transmission and reception of radio frequency signals. The wireless transceiver 108 includes a plurality of antennas, at least one of which operates as a main reception antenna and at least another one of which operates as a diversity reception antenna. Each antenna is designed to cover all required frequency bands for its particular transceiver function.

The signals received by the first and second antennas can be combined to improve the overall reception of the transceiver 108 through the use of diversity algorithms. Such diversity algorithms utilize radio frequency characteristics that are not directly related to signal strength. Therefore, the diversity algorithms can be utilized in a multi-antenna system in which the "diversity antenna" may have reduced performance compared with its main receiver counterpart antenna. The wireless transceiver 108 and/or the antennas associated with the wireless transceiver 108 can be located anywhere within the device 110 to optimize wireless communications. For example, in some embodiments, the antennas are located at opposite corners of the display 112 to improve diversity.

In addition to the wireless transceiver 108, the device 110 generally comprises a processor that executes software programs, storage devices, such as disks and/or semiconductor memory for storage of programs and data, operator interface devices, such as a keyboard, mouse, display, etc., various input/output devices, and busses that couple the components of the device 110 together.

Figure 2:
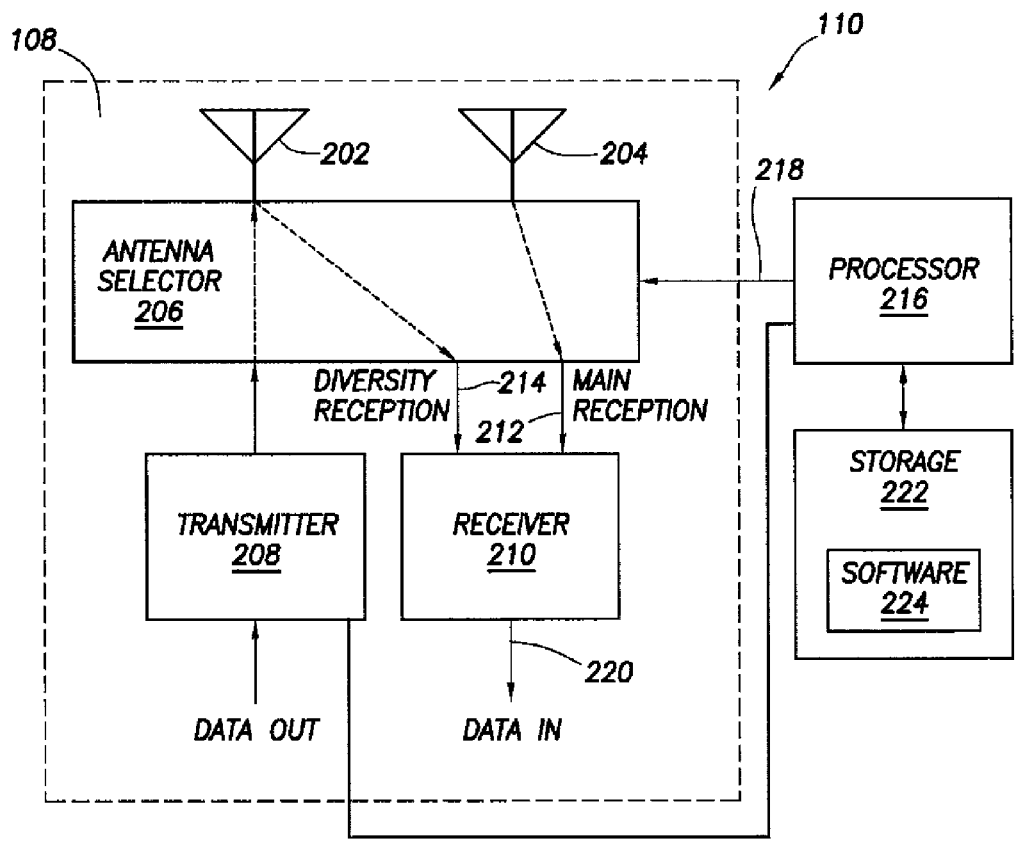
FIG. 2 shows a block diagram of an illustrative wireless communication device transceiver implementing the techniques disclosed herein, in accordance with embodiments.

FIG. 2 shows a block diagram of the communication device 110 including the illustrative wireless transceiver module 108 implemented in accordance with various embodiments. As shown, the device 110 also includes a processor (or "processing logic") 216 coupled to storage 222 and to the transceiver module 108. The storage 222 may comprise any suitable type of storage, including random access memory (RAM), read-only memory (ROM), etc. Storage 222 comprises software 224, which is executable by the processor 216. In some embodiments, instead of being stored in storage 222, the software 224 may comprise firmware embedded on the processor 216. The transceiver module 108 includes a first antenna 202, a second antenna 204, an antenna selector 206, a transmitter 208, and a receiver 210. While the embodiment illustrated includes only two antennas 202, 204, other embodiments may include more than two antennas. The antenna selector (or "switching logic") 206 couples to the processor 216 which, in turn, couples to storage 222. The processor 216 can manipulate the antenna selector 206 so that any antenna can couple to any transmitter or receiver. However, in at least some embodiments, the antenna selector 206 generally remains in a state in which the transmitter 208 couples to antenna 202, a diversity receiver connection 214 couples to antenna 202 and a main receiver connection 212 couples to antenna 204.

Antenna 202 is configured to operate as a main transmission antenna. Thus, the antenna 202 handles most or all of the data provided by the transmitter 208 for wireless transmission out of the transceiver 108. The antenna 202 is configured for its duties as the main transmission antenna by the processor 216 and the antenna selector 206 operating in concert. The processor 216, as a result of executing software 224, detects (e.g., using an interrupt) when the transmitter 208 is ready to wirelessly transmit data. In turn, the processor 216 manipulates the antenna selector 206 so that the data output by the transmitter 208 is provided to the antenna 202 and not to the antenna 204. In this way, the antenna 202 operates as the main (and only) transmission antenna.

Further, in accordance with embodiments, the antenna 202 is also configured to perform as the diversity reception antenna. Thus, data received by the antenna 202 is used in combination with data received by the antenna 204 (as described below) to accurately determine what data was transmitted to the transceiver 108. The antenna 202 is configured for its duties as the diversity reception antenna by the processor 216 acting in concert with the antenna selector 206. The processor 216, as a result of executing software 224, detects when data has arrived at the antenna 202. In turn, the processor 216 manipulates the antenna selector 206 so that the data received at the antenna 202 is routed through the antenna selector 206 to a receiver diversity connection 214. In this way, received diversity data is provided to the receiver 210 via the antenna 202.

In accordance with embodiments, the antenna 204 is configured to perform as the main reception antenna. The antenna 204 is used by the receiver 210 as the primary antenna by which received data is interpreted, but data received by the antenna 204 is supplemented by diversity data received by antenna 202 in order to determine what data was originally transmitted to the transceiver 108. The antenna 204 is configured for its duties as the main reception antenna by the processor 216 acting in concert with the antenna selector 206. The processor 216, as a result of executing software 224, detects when data has arrived at the antenna 204. In turn, the processor 216 manipulates the antenna selector 206 so that the data received at the antenna 204 is routed through the antenna selector 206 to a main receiver connection 212. In this way, received data is provided to the receiver 210 via the antenna 204.

Thus, while antenna 202 performs data transmission and diversity reception functions, in at least some embodiments, antenna 202 does not perform main reception functions. Further, in some embodiments, antenna 202 is the only antenna in the device 110 and/or transceiver 108 that performs data transmission. In some embodiments, antenna 202 is the only antenna in the device 110 and/or transceiver 108 that performs diversity reception. Similarly, while antenna 204 performs main reception functions, in at least some embodiments, antenna 204 does not perform data transmission or diversity reception functions. Further, in some embodiments, antenna 204 is the only antenna in the device 110 and/or transceiver 108 that performs main, non-diversity reception.

Figure 3:
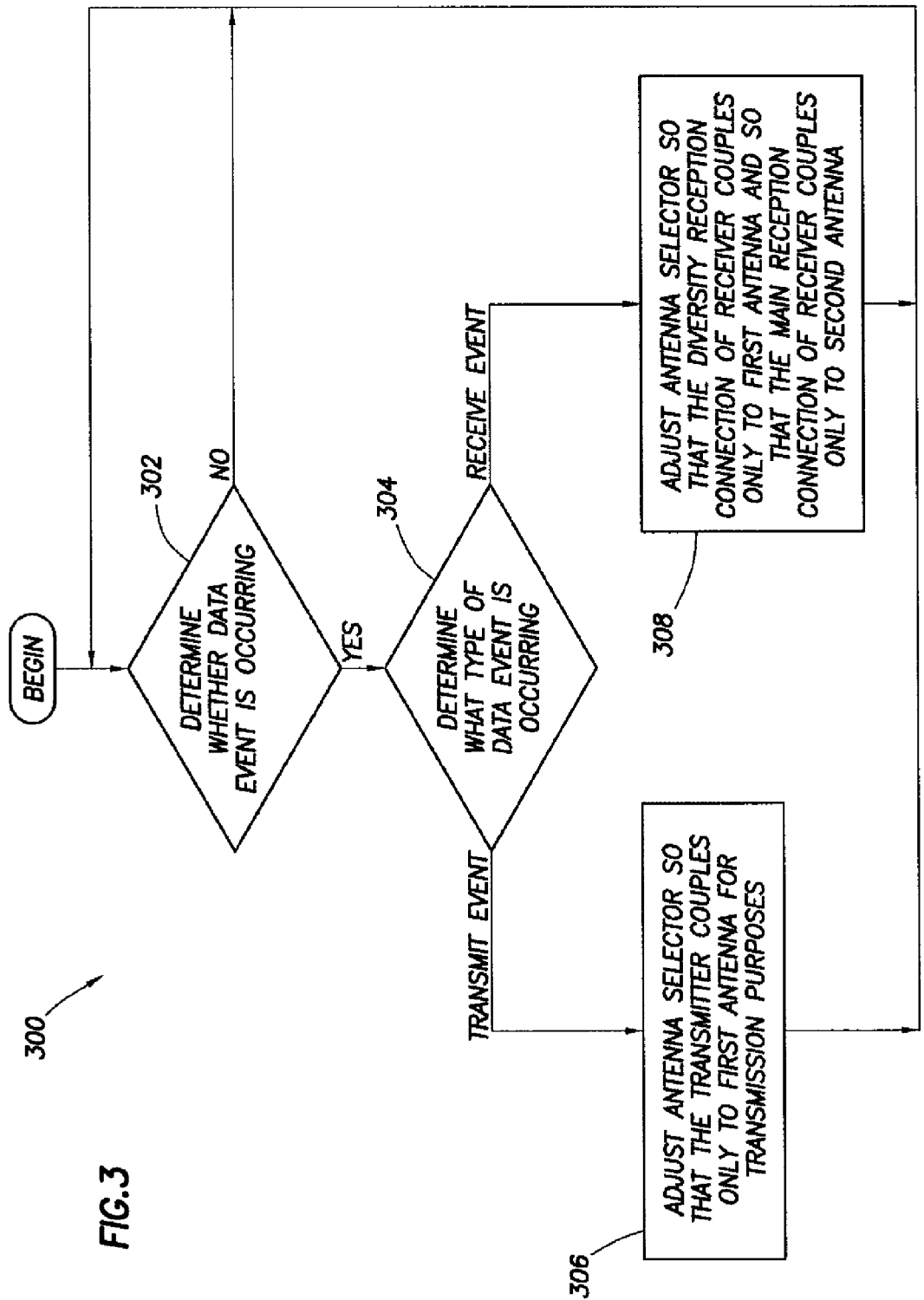
FIG. 3 shows a flow diagram of an illustrative method implemented in accordance with embodiments.

FIG. 3 shows a flow diagram of an illustrative method 300 implemented in accordance with various embodiments. The method 300 begins with the software 222 causing the processor 216 to determine whether a data event is occurring (block 302). Specifically, the processor 216 determines whether the transmitter 208 is ready to wirelessly transmit data or one or both of the antennas 202, 204 has received data that is to be routed to the receiver 210. Such an operation may be performed using, e.g., an interrupt. If no such data event is occurring, control of the method 300 returns to block 302. However, if such a data event is occurring, the method 300 comprises determining what type of data event is occurring (block 304). Specifically, the processor 216 determines whether a transmission event or reception event is occurring.

If a transmission event is occurring, meaning that the transmitter 208 is prepared to wirelessly transmit data, the method 300 comprises adjusting the antenna selector 206 so that, for transmission purposes, the transmitter 208 couples to the antenna 202 and not to another antenna (e.g., not to the antenna 204) (block 306). In this way, the antenna 202 and only the antenna 202 is used for main transmission purposes.

Alternatively, in case a reception event is occurring, meaning that the antenna 202 and antenna 204 have received and/or are receiving data, the method 300 comprises processor 216 adjusting the antenna selector 206 so that the diversity reception connection 214 of the receiver 210 couples to the antenna 202 and not to the antenna 204 (block 308). In this way, the antenna 202 and only the antenna 202 is used for diversity reception purposes. Further, the method 300 comprises processor 216 adjust the antenna selector 206 so that the main reception connection 212 of the receiver 210 couples to the antenna 204 and not to the antenna 202 (block 308). In this way, the antenna 204 and only the antenna 204 is used for main reception purposes.

By designating the antenna 202 as the main transmission antenna and diversity reception antenna, and further by designating the antenna 204 as the main reception antenna, bandwidth requirements are spread more evenly across multiple antennas than in other multi-antenna systems. This is because diversity reception generally requires less bandwidth than does main, non-diversity reception. The distribution of bandwidth across multiple antennas allows each antenna to have improved performance around its allocated frequencies when compared to other solutions. For example, given a constant volume/antenna size, an antenna with smaller bandwidth requirements will have better performance compared to antennas with greater bandwidth requirements.

In another example, smaller antenna sizes are achieved. Specifically, given constant levels of performance, an antenna with narrow bandwidth requirements will occupy less space than an antenna with greater bandwidth requirements. Multi-antenna systems implementing techniques disclosed herein result in either better performance or smaller antenna size by distributing the main reception and main transmission functions among the multiple antennas.

Figure 4:
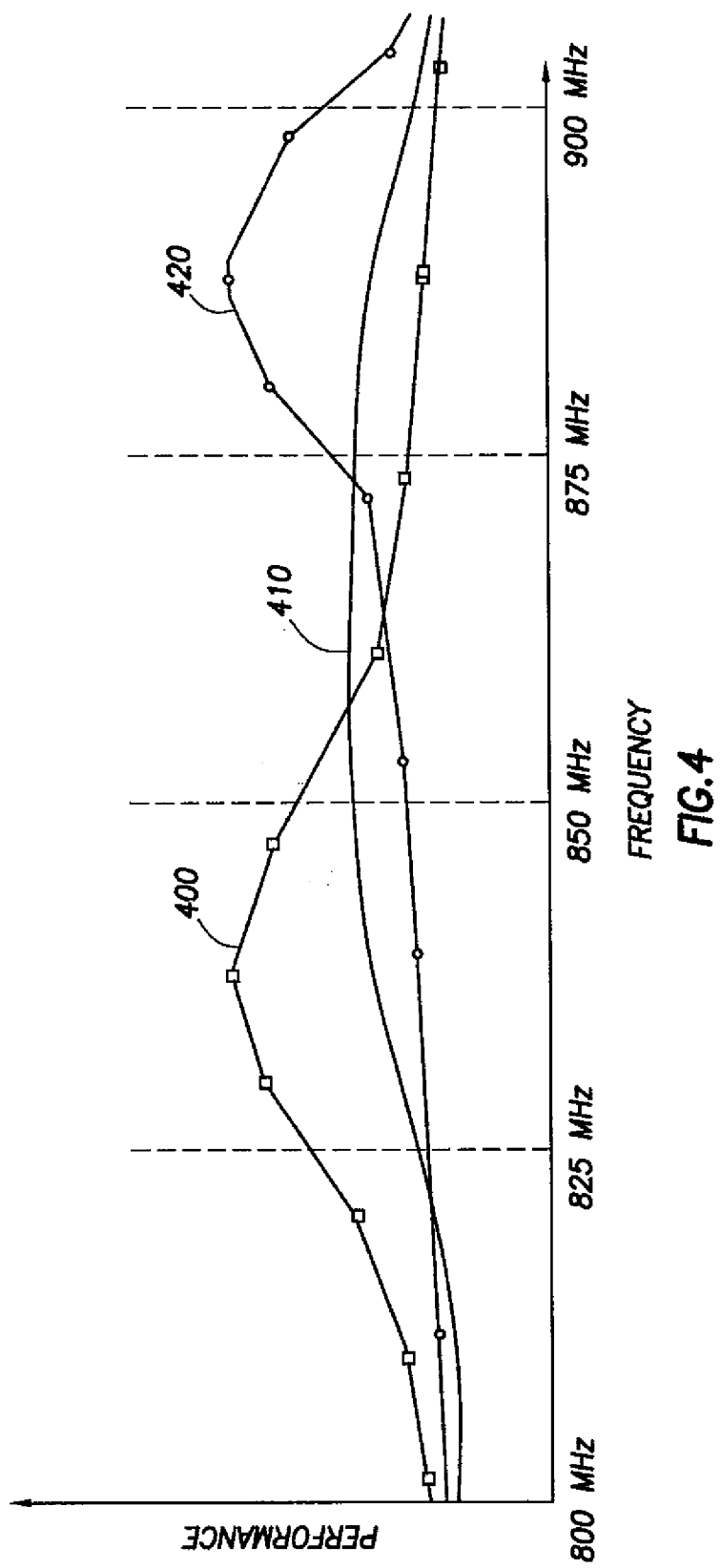
FIG. 4 shows a graphical illustration of hypothetical performance improvements achievable by the techniques disclosed herein in contrast to the hypothetical performance of other solutions, in accordance with embodiments.

FIG. 4 shows a graphical representation of the theoretical performance of multi-antenna designs that do not implement the techniques disclosed herein. The performance levels are shown at various frequencies. In particular, curve 410 illustrates the performance of such antenna designs across a spectrum of frequencies ranging from 800 MHz to 900 MHz. As shown, the performance is relatively flat for transmit and receive functions.

In contrast, curves 400 and 420 illustrate theoretical performance levels of multi-antenna designs that implement the techniques disclosed herein. The tall "humps" of curves 400 and 420 represent embodiments which divide the bandwidth coverage for main reception (curve 400) and main transmission (curve 420) among different antennas. The tall humps of curves 400 and 420 indicate improved antenna resonance. In turn, improved antenna resonance directly relates to improved antenna receive and/or transmit performance capability for those frequencies. By reducing the number of frequency bands each antenna 202, 204 is configured to cover, the performance of each antenna 202, 204 in its respective bands can be improved. This improvement is illustrated by the increased resonance (the "humps") of curves 400 and 420.

A diversity antenna need not perform at the same level as a main antenna in order to provide full diversity benefit. Consequently, the performance level of antenna 202 (illustrated by curve 420) in the receive band is sufficient to provide signals for the diversity algorithm.

The data points and data curves shown in FIG. 4 and described herein only serve to illustrate predicted performance levels of systems that implement the techniques disclosed herein when compared to systems that do not. The information shown in FIG. 4 and described herein is of a hypothetical nature and does not represent the result(s) of any particular test, experiment, study or prototypical simulation.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A device, comprising:
    a processor to determine a data event and designate an antenna based on the data event;
    a first antenna, wherein only the first antenna transmits data when the data event is a data transmission; and
    a second antenna, wherein the second antenna is the main reception antenna when the data event that is a data reception and the first antenna operates as a diversity antenna to determine what data was transmitted during the data transmission.

2. The device of claim 1, wherein the second antenna does not transmit data.

3. The device of claim 1, wherein the first antenna is the only antenna in said device that performs diversity reception.

4. The device of claim 1, wherein the second antenna is the only antenna in said device that performs non-diversity reception.

5. The device of claim 1, wherein the device comprises a mobile communication device.

6. A system, comprising:
    processing logic to determine a data event and designate an antenna based on the data event;
    switching logic coupled to the processing logic; and
    a first antenna and a second antenna, each of said antennas coupled to the switching logic;
    wherein, as a result of determining that an outgoing data event is ready for transmission, the processing logic adjusts the switching logic so that said outgoing data is provided from a transmitter to the first antenna;
    wherein, as a result of determining that an incoming data event has been received or is being received, the processing logic adjusts the switching logic so that the first antenna operates to receive said incoming data as a diversity antenna to determine what data was transmitted during the transmission and said second antenna operates to receive said incoming data as a non-diversity antenna.

7. The system of claim 6, wherein, as a result of said determination that said incoming data has been received or is being received, the processing logic adjusts the switching logic so that the first antenna does not perform non-diversity data reception functions.

8. The system of claim 6, wherein, as a result of said determination that said incoming data has been received or is being received, the processing logic adjusts the switching logic so that the second antenna does not perform diversity reception functions.

9. The system of claim 6, wherein, as a result of said determination that said outgoing data is ready for transmission, the processing logic adjusts the switching logic so that the second antenna does not perform transmission functions.

10. The system of claim 6, wherein the system comprises a mobile communication device selected from the group consisting of a notebook computer, a personal digital assistant and a cellular telephone.

11. A method, comprising:
    determining a data event and designating an antenna from a multi antenna system based on the data event;
    transmitting data with a first antenna when the data event is a data transmission;
    operating said first antenna as a diversity reception antenna when the data event that is a data reception; and
    operating said second antenna as a main reception antenna, but not operating the second antenna as a diversity reception antenna when the data event that is a data reception and the first antenna operates as a diversity antenna to determine what data was transmitted during the data transmission.

12. The method of claim 11, further comprising not operating the first antenna as a main reception antenna.

13. The method of claim 11, further comprising not transmitting data with the second antenna.

* * * * *